United States Patent

Preisendoerfer

[11] Patent Number: 5,813,677
[45] Date of Patent: Sep. 29, 1998

[54] SEAL BETWEEN TWO INTERLOCKING COMPONENTS

[75] Inventor: Gerhard Preisendoerfer, Heusenstamm, Germany

[73] Assignee: Forsheda-Stefa GmbH, Germany

[21] Appl. No.: 872,640

[22] Filed: Jun. 10, 1997

Related U.S. Application Data

[63] Continuation of Ser. No. 634,136, Apr. 19, 1996, abandoned, which is a continuation of Ser. No. 244,406, Oct. 31, 1994, abandoned.

[30] Foreign Application Priority Data

Sep. 21, 1992 [DE] Germany ................ 92 12 666 U

[51] Int. Cl.$^6$ ............ F16L 21/025; M02G 15/013
[52] U.S. Cl. ............ 277/604; 277/617; 277/627
[58] Field of Search .............. 277/180, 188 R, 277/207 A, DIG. 2; 285/110, 288, 230, 231, 345, 351, 423

[56] References Cited

U.S. PATENT DOCUMENTS

| | | | |
|---|---|---|---|
| 4,153,261 | 5/1979 | McLeod | 277/207 A X |
| 4,174,859 | 11/1979 | Houghton | 285/345 X |

FOREIGN PATENT DOCUMENTS

| | | | |
|---|---|---|---|
| 343677 | 11/1989 | European Pat. Off. | 285/230 |
| 507005 | 10/1992 | European Pat. Off. | 285/230 |
| 2252089 | 5/1973 | Germany | 277/207 A |
| A4108107 | 4/1983 | Germany . | |
| A3801748 | 7/1989 | Germany . | |
| 4108107 | 11/1992 | Germany | 285/230 |
| A4108107 | 11/1992 | Germany . | |
| 1222364 | 2/1971 | United Kingdom | 285/231 |
| 2256019 | 11/1992 | United Kingdom | 285/230 |

*Primary Examiner*—Randolph A. Reese
*Assistant Examiner*—John L. Beres
*Attorney, Agent, or Firm*—Gifford, Krass, Groh, Sprinkle, Patmore, Anderson & Citkowski, P.C.

[57] ABSTRACT

A seal between two interlocking components, especially tubes, with a compression lip (3) and a supporting foam rubber ring (12). The rear space as far as the cone surface can be empty or filled with light foam rubber.

6 Claims, 3 Drawing Sheets

SEAL BETWEEN TWO INTERLOCKING COMPONENTS

This is a continuation of application Ser. No. 08/634,136 filed on Apr. 19, 1996, now abandoned, which is a continuation of copending application Ser. No. 08/244,406 filed on Oct. 31, 1994, now abandoned.

This invention relates to a sealing device for sealing between two telescopically insertable parts, particularly concrete tubes, each insertable part including a bell-shaped socket having an axially extending inner surface and a radially extending inner surface, and a spigot end which, when a gasket is inserted, fits into one another; the gasket is fixed by anchoring means within the socket. An annular space extends between the gasket and radially extending inner surface and in which lip-shaped portions of the gasket can laterally yield when a spigot end is inserted into the socket.

Seals of this kind are known in numerous embodiments (see German patents nos. 2,140,546, 2,252,089, 2,935,392, 3,100,192, 3,232,823, 3,345,569, and 3, 507, 909). With these seals, either a removable form ring is used to create the annular space within the socket wherein the lip-shaped portions of the gasket can laterally yield, or a collar and a web-shaped support element are created to form a clearance space (German patent no. 3,345,569) wherein the lip-shaped portion can yield laterally.

For sealing between concrete tubes, mainly two types of seals are used, namely the roll gasket or O-ring and the sliding gasket. There are two different kinds of sliding gasket, the compression gaskets and the lip-seal gasket. The sealing function at the compression gasket is based on the compressibility thereof whereas with lip-seal gaskets the narrow-line engagement zone on the member to be sealed is sufficient, if the lip is slightly bent and an overpressure within the tube biases the lip. Seals with lip-seal gaskets allow an easy assemblage of the parts to be sealed, since there are only small axial forces necessary when the parts are telescopically inserted into one another. On the other hand, no larger radial forces between the parts to be sealed can be transferred through the lip seal. Here the compression seal has advantages. Furthermore, compression seals are less sensitive to damages than are lip seals. In order to use the advantages of both kinds of sliding gaskets, the so-called "compression lip" has been created which is a compression seal having overhanging portions. If the insertable parts have too narrow of a fit, the compression lip is bent too much when the parts are assembled, and there is the danger of forming fissures and of deforming the gasket. The same danger occurs, if excessive radial loads are transferred through the gasket, which happens with buried tubes as the assembled parts.

The present invention remedies the above-mentioned limitations in the various prior art approaches. Therefore, it is an object of the invention to provide a seal of the kind referred to above where the favorable features of the compression lip can be used, yet the danger of overstressing the compression lip is essentially reduced.

The problem is solved in that the seal is formed with a compression lip seal and, by means of a lip-forming gap, is separated from a foamed rubber ring which occupies the ring space at least partially.

The compression lip seal may be compressed and bent in the normal operation of the seal without foamed the rubber ring. However, if compression and bending action exceeds a predetermined level, the foamed rubber ring will be effective and will offer a support which completes the seal as a broader compression seal.

According to a preferred embodiment of the invention, the lip-forming gap is V-shaped so as to favor bending of the compression lip at the root of the gap i.e. (forming a hinge) and to favor gripping over the foamed rubber ring when being loaded, so that the foamed rubber ring can be used as a support for the overhanging lip.

When the foamed rubber ring compresses when being loaded, a laterally yielding space can be created for the foamed rubber ring. For that purpose, the socket has steps or shoulders in the annular space between gasket and radially extending inner surface, so as to provide chambers with different depths which decrease in direction to the radially extending inner surface of the socket.

Embodiments of the invention will be described on the basis of the drawings.

Figure 5:
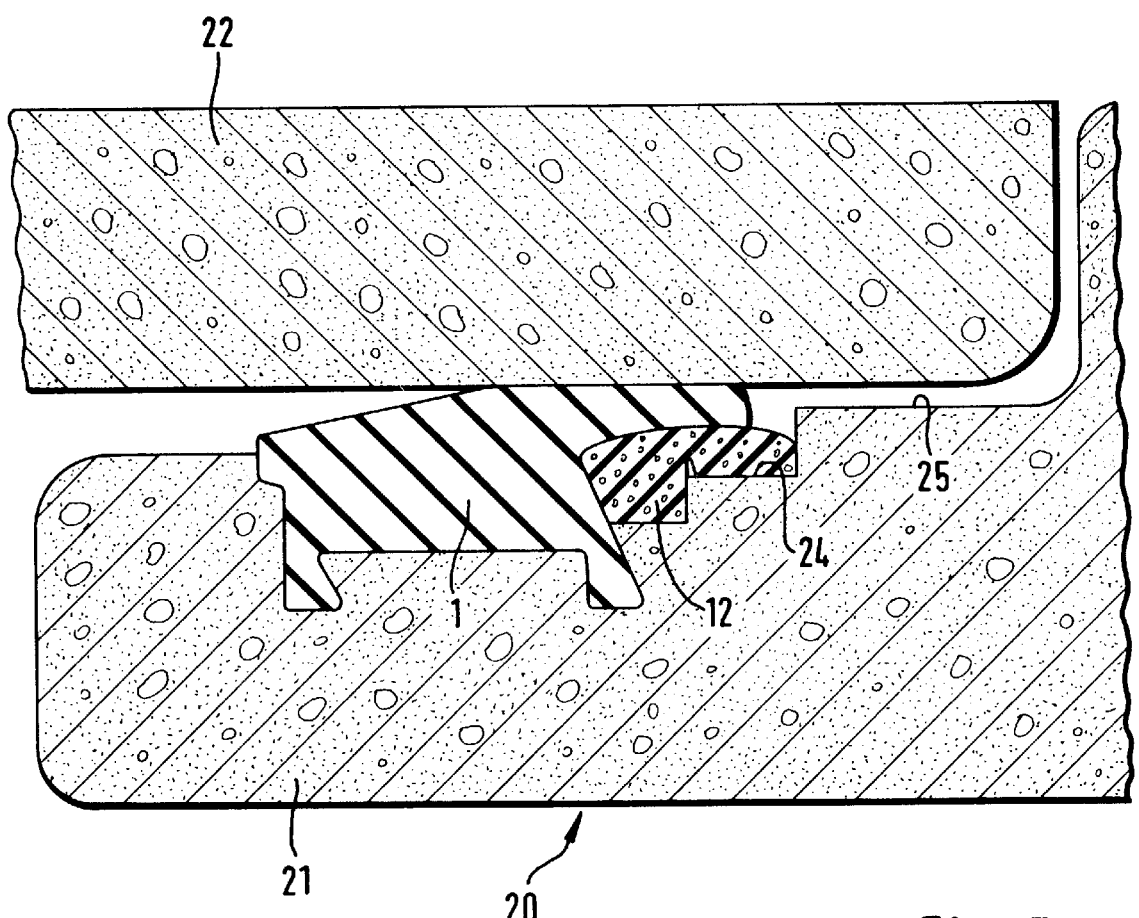

FIG. 5 the fourth embodiment in an assembled condition.

Figure 1:
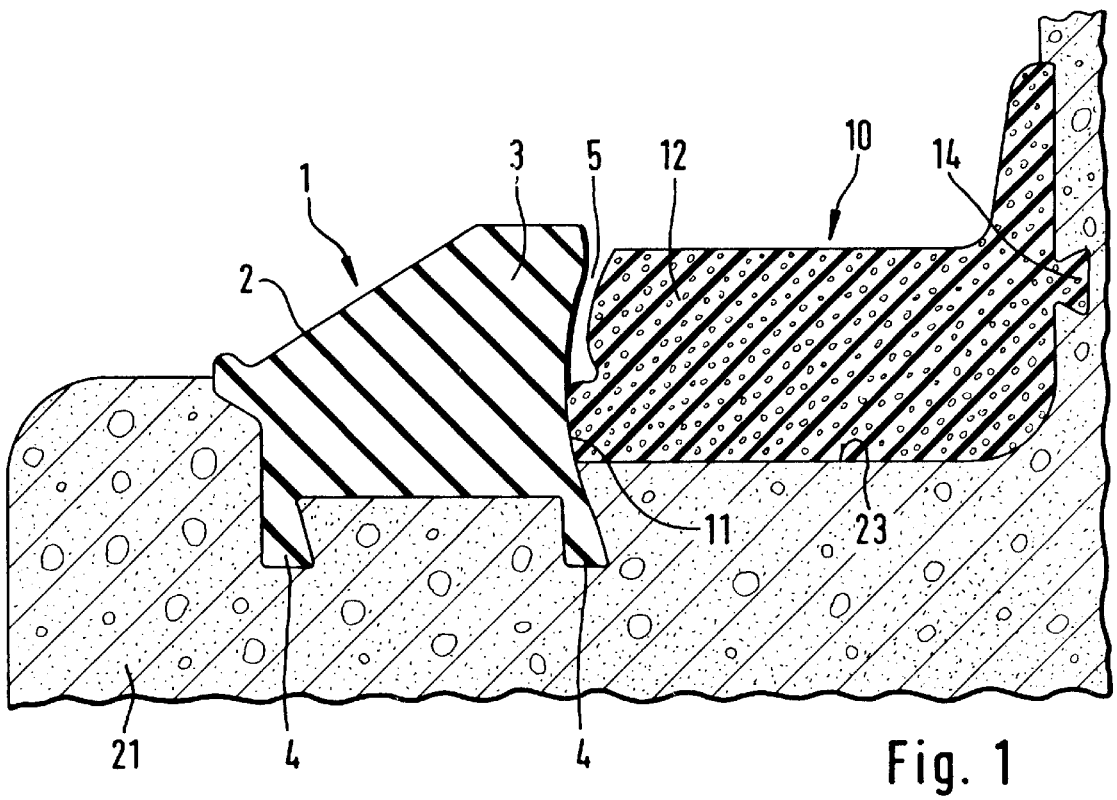
FIG. 1 is a sectional view through a gasket according to a first embodiment.

FIG. 1 shows a sliding seal 1 made of elastomer or rubber and, for being inserted, has an inclined or bevelled surface 2 and a so-called compression lip 3. The gasket 1 is anchored in a bell-shaped socket 21 by means of feet or flanges 4 having a dove-tailed cross section. The compression lip 3 is separated by means of a gap 5 from a filling ring 10 made of foamed rubber which is fixed to the gasket 1 by an adhesive surface 11. The filling ring 10, together with the gasket 1, is bonded and integrated in the socket when the socket is molded. For this purpose, the filling ring 10 may comprise feet 14 or corresponding anchoring means. Whereas the sliding gasket 1 may have a Shore (A method) hardness of 50, the filling ring 10 has a shore hardness of between 20 and 30.

The seal shown will be compressed when a spigot end is telescopically inserted, whereby the radial dimension of the compression lip 3 decreases and at the same time the compression lip 3 is bent to the toward the filling ring 10. The gap 5 thereby will essentially disappear and the compression lip 3 will engage the filling ring 10 (which is made of foamed rubber) in the foamed rubber ring 12 and will be compressed. When the cellular spaces within the foamed rubber have been consumed in this foamed rubber ring 12, the hardness of the foamed rubber ring increases rapidly so that a support surface or anvil is formed for the compression lip 3 and the latter will not be further bent. In this manner, when there are large radial loads, the seal changes in a compression seal without remarkable lip function whereas, when the radial force decreases, the lip function of the seal will be effective once more.

Figure 2:
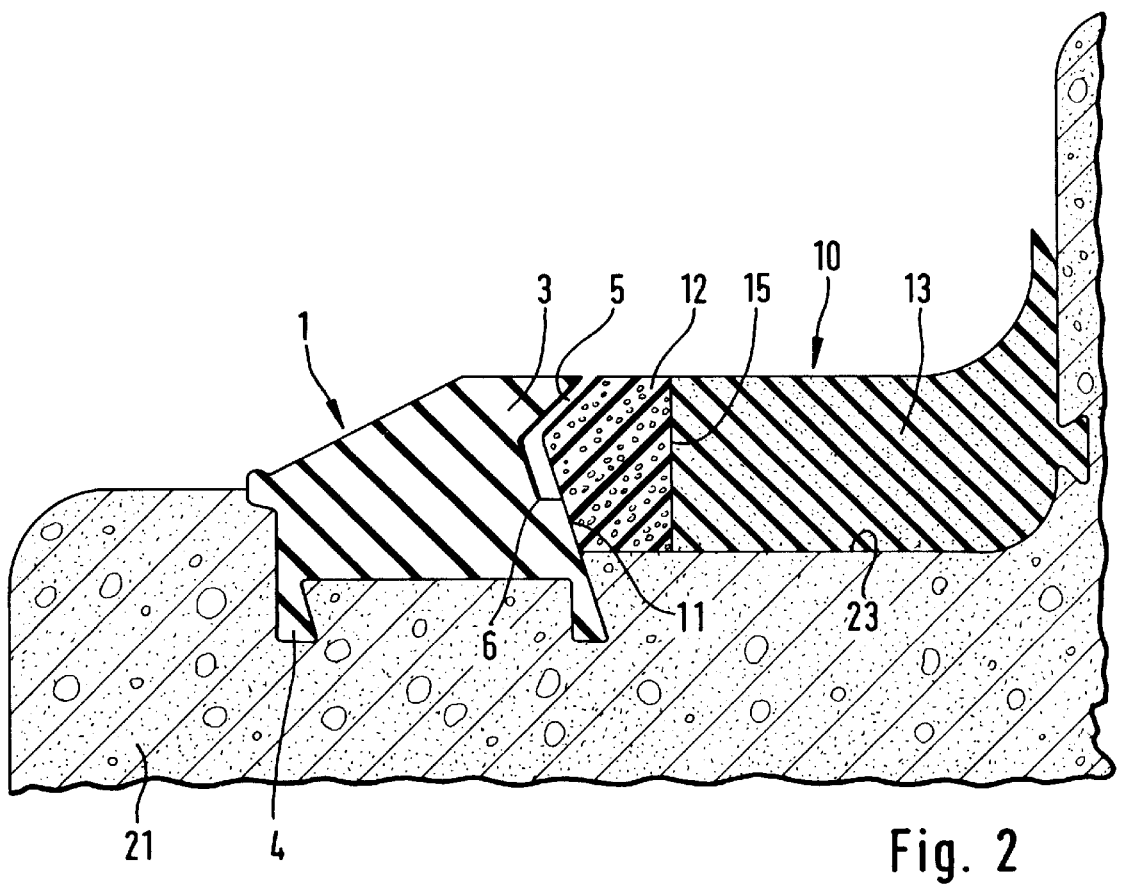
FIG. 2 is a second embodiment of the gasket integrated into the socket.

FIG. 2 shows a variation of the seal 1 and of the filling ring 10. The latter is composed of two rings 12 and 13 which are fixed to one another along the radial surface 15, whereas the ring 13 may also consist of a cheaper plastic foam part. The gap 5, seen in cross-section, has a V-shape and, at its root, has an edge 6 which forms a hinge for the compression lip 3 which in an overhanging condition can be supported by the foamed rubber ring 12.

Figure 3:
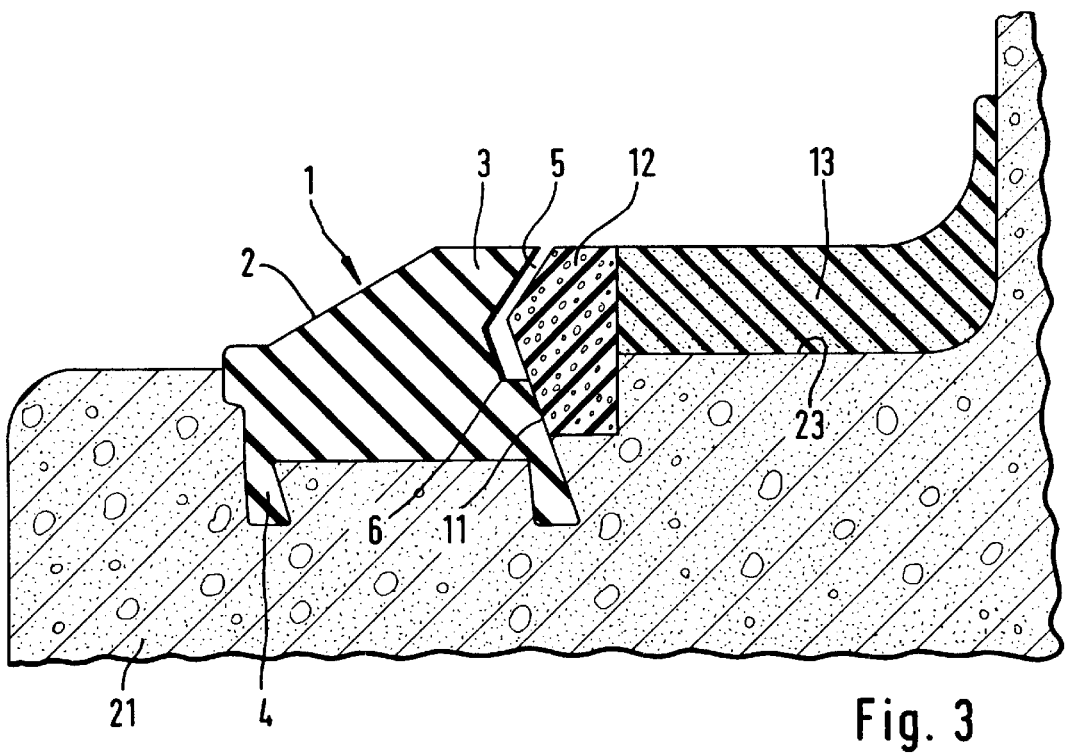
FIG. 3 is a third embodiment.

FIG. 3 shows a further embodiment where the ring 13 is adapted to be removed from the socket. The ring 13 is formed as a so-called chamber ring, that is, its radial dimension (nearly) is the same as the radial dimension of the seal ring 1. By these means, more material to be compressed is provided with the chamber ring 12.

Figure 4:
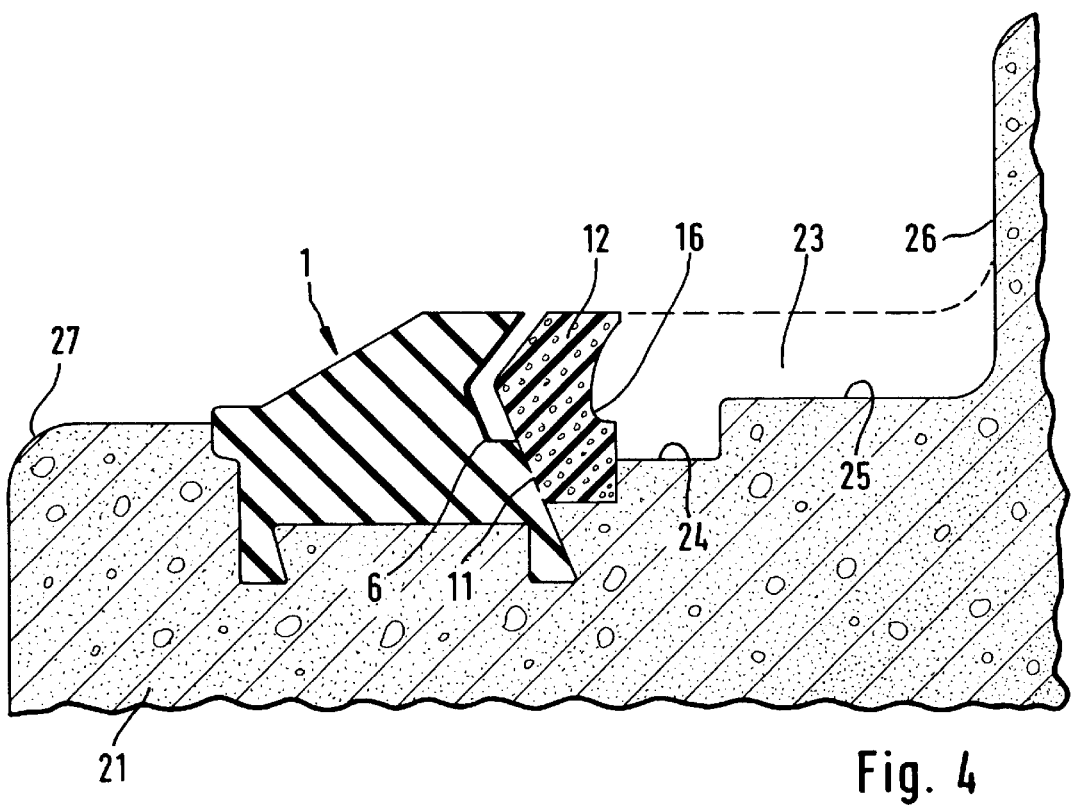
FIG. 4 is a fourth embodiment.

FIG. 4 shows a further variation, mainly at the inner side of the socket in an annular region 23. This annular region is shaped with steps or shoulders so as to form a ring chamber 24 which may take up portions of the foamed rubber ring 12 when the latter compresses upon being loaded. For this purpose, the ring 12 has a folding line 16 which favors this.

The axially extending inner surface 25 of the socket adjacent to the radially extending inner surface 26 has a smaller radial diameter than the inner side of the socket near the rounded insertion 27. When there are large radial loads, the spigot end 22 (FIG. 5) will engage the surface 25, thus avoiding further radial compression of the seal and therefore crashing thereof is avoided. The volume of the ring chamber 24 is dimensioned for this load case, that is, the bent ring 12 and the overhanging portions of the compression lip 3 can be taken up in the ring chamber 24.

FIG. 5 shows the socket seal in use. When the radial loads increase, the foamed rubber ring 12 is further compressed, and the compression lip 3 yields laterally into the chamber 24 whereas these parts return into its sealing position shown when the radial load will decrease again.

I claim:

1. In combination; a sealing device between two telescopically insertable concrete parts, one of said insertable parts having a bell shaped socket and the other of said insertable parts having a spigot end to be received by said socket of the other of said insertable parts, said sealing device being molded into the concrete forming said socket end of said insertable part and comprising a sliding seal having anchoring means for being fixed within said socket end of said insertable part;

said socket having an axially extending inner surface and a radially extending inner surface and said sliding seal being fixed in said socket to form an annular space extending between said sliding seal and said radially extending inner surface;

said sliding seal having a lip portion which is adapted to laterally yield into said annular space when said spigot end of one of said insertable parts is inserted into the socket of the other of said insertable parts whereby to form a lip seal between said insertable parts;

characterized in that a foamed rubber ring is mounted to said spigot end of said insertable part within said annular space;

said sliding seal and said foamed rubber ring each having a lower portion in engagement and an upper portion axially separated from one another by a gap defining the form of said lip portion of said sliding seal whereby upon compression forces being created by the insertion of said spigot end into said socket reaching a predetermined maximum said upper portion of said sliding seal moves into engagement with said upper portion of said foamed rubber ring to stiffen said foamed rubber ring and thereby converts said sliding seal from a lip seal to a compression seal.

2. The combination set forth in claim 1 wherein said sliding seal includes a folding line (6) for forming a hinge for said upper portion of said sliding seal.

3. The combination to claim 1 wherein said gap (5) has a V-shaped cross-section.

4. The combination set forth in claim 1 wherein the socket (21) includes shoulders arranged in said annular space (23) so as to define chambers (24, 25) having different depths decreasing in direction away from said sliding seal.

5. The combination set forth in claim 4 further including a foam ring (13) removably mounted to said socket overlying and adjacent said shoulders.

6. The combination set forth in claim 1 further comprising a filling ring (10) which is arranged in said annular space (23), said foamed rubber ring (12) forming a portion of said filling ring (10).

* * * * *